US006529971B1

United States Patent
Thiesfeld

(10) Patent No.: US 6,529,971 B1
(45) Date of Patent: Mar. 4, 2003

(54) ADAPTIVE ELASTICITY FIFO BUFFER

(75) Inventor: Charles W. Thiesfeld, Lakeville, MN (US)

(73) Assignee: Seagate Technology, LLC, Scotts Valley, CA (US)

( * ) Notice: Subject to any disclaimer, the term of this patent is extended or adjusted under 35 U.S.C. 154(b) by 0 days.

(21) Appl. No.: 09/344,765

(22) Filed: Jun. 25, 1999

Related U.S. Application Data
(60) Provisional application No. 60/090,869, filed on Jun. 26, 1998.

(51) Int. Cl.$^7$ ............................ G06F 3/100; G06F 13/00
(52) U.S. Cl. ............................. 710/53; 710/52; 710/57; 370/407; 370/514
(58) Field of Search ............................. 710/52, 53, 57; 370/85.7, 514, 407

(56) References Cited

U.S. PATENT DOCUMENTS

| | | | | |
|---|---|---|---|---|
| 5,295,246 A | * | 3/1994 | Bischoff et al. | 710/34 |
| 5,361,335 A | * | 11/1994 | Oyadomari | 710/57 |
| 5,450,546 A | * | 9/1995 | Krakirian | 710/57 |
| 5,696,931 A | | 12/1997 | Lum et al. | 711/113 |
| 5,822,540 A | * | 10/1998 | Caldara et al. | 709/236 |
| 6,112,252 A | * | 8/2000 | Hausman et al. | 709/250 |
| 6,157,652 A | * | 12/2000 | Henson et al. | 370/407 |
| 6,266,385 B1 | * | 7/2001 | Roy et al. | 375/372 |

OTHER PUBLICATIONS

IBM—Technical Disclosure Bulletin, vol. 37, No. 12, Dec. 1994, pp. 611–613.*
"Fibre Channel—Arbitrated Loop (FC–AL–2)—REV 6.3", NCITS Working Draft Proposal, American National Standard for Information Technology, 146 p., (May 29, 1998).
"Fibre Channel—Physical and Signaling Interface (FC–PH)—REV 4.3", Proposed Working Draft, American National Standard for Informations Systems, 478 p., (Jun. 1, 1994).

* cited by examiner

*Primary Examiner*—Jeffrey Gaffin
*Assistant Examiner*—Tammara Peytm
(74) *Attorney, Agent, or Firm*—Kirk A. Cesari

(57) ABSTRACT

According to one embodiment of the present invention a method of operating a data network loop having at least two nodes includes monitoring deletions in an adaptive elasticity first-in, first-out (FIFO) buffer in each node, identifying each adaptive elasticity FIFO buffer that is a deleter, the deleter being an adaptive elasticity FIFO buffer for which information is deleted more often than information is inserted, and reducing a deletion threshold for each adaptive elasticity FIFO buffer that is a deleter. According to another embodiment of the present invention a buffer includes an adaptive elasticity FIFO buffer and a control circuit operatively configured to monitor deletions in the adaptive elasticity FIFO buffer, determine if the adaptive elasticity FIFO buffer is a deleter, and reduce a deletion threshold for the adaptive elasticity FIFO buffer if the adaptive elasticity FIFO buffer is a deleter.

19 Claims, 8 Drawing Sheets

ADAPTIVE ELASTICITY FIFO BUFFER

RELATED APPLICATION

This application claims the benefit of U.S. Provisional Application Ser. No. 60/090,869, filed Jun. 26, 1998 under 35 USC119(e).

FIELD OF THE INVENTION

The present invention relates to the field of interfaces in information handling systems. More particularly, this invention relates to an adaptive elasticity First-in, first-out buffer in an interface of an information handling system.

BACKGROUND OF THE INVENTION

One of the key devices of any computer system is a place to store data. Computer systems have many different places where data can be stored. One common place for storing massive amounts of data is a disc drive. The most basic parts of a disc drive are a disc that is rotated and on which data is stored, an actuator that moves a transducer to various locations over the disc, and electrical circuitry that is used to write data to and read data from the disc through the transducer. Data is stored on one or both surfaces of the disc. The disc drive also includes circuitry for encoding data written to the disc and for decoding data retrieved from the disc. A microprocessor controls most of the operations of a disc drive including passing information, such as instructions or data, read from the disc back to a requesting computer and taking information from the requesting computer for writing to the disc.

The disc drive communicates with other devices in a computer system such as the requesting computer over an interface. The performance of the computer system depends in part on the bandwidth of the interface. The bandwidth determines the speed with which information signals may be transmitted over the interface. The performance of the computer system improves with increases in the bandwidth of the interface which results in a faster transfer of information signals between the devices in the computer system.

A fibre channel is one example of an interface with a high bandwidth. The fibre channel is a standardized interface described in AMERICAN NATIONAL STANDARDS INSTITUTE, FIBRE CHANNEL—PHYSICAL AND SIGNALING INTERFACE (FC-PH) (Rev 4.3 1994). The fibre channel is a point-to-point physical interface, transmission protocol, and signaling protocol of a serial link for the support of higher level transmission protocols for controlling the communication of information including data and instructions. One of the higher level protocols is described in AMERICAN NATIONAL STANDARDS INSTITUTE, FIBRE CHANNEL—ARBITRATED LOOP (FC-AL-2) (Rev 6.3 1998). Under the arbitrated loop protocol FC-AL-2, devices in the computer system are linked in series in a topology, specifically a data network loop called a fibre channel arbitrated loop. A fibre channel arbitrated loop is distinguished from an ordinary fibre channel in that each device, which is called a node in the loop, is connected to the loop through a node-loop port which arbitrates access to the loop under FC-AL-2. The node-loop port receives information signals from a preceding node through an incoming fibre and transmits information signals through an outgoing fibre to a succeeding node. Each fibre is a serial information transmission medium and may be a coaxial wire such as a coaxial copper conductor. The fibre may also comprise an optical fibre for some or all of its length.

The loop is closed to comprise a circular interface. When a transmitting node is in communication with a receiving node, information signals may pass through one or more intermediate nodes before reaching the receiving node. Each intermediate node receives and then transmits the information signals along to the succeeding node until they reach the receiving node. Transmissions are governed by a crystal in each node that feeds a clock signal source that determines the frequency at which the information signals are transmitted to the next node. Succeeding crystals are slightly different physically, and operate at different local temperatures such that nodes have slightly different transmission frequencies. An intermediate node will receive information signals at a receiving frequency and then transmit the information signals at a slightly different transmission frequency.

First-in, first-out (FIFO) buffers, also called elasticity FIFO buffers, are located in each port to accumulate and temporarily store received information at the receiving frequency and to provide the information to be transmitted at the transmission frequency. Information is stored in each elasticity FIFO buffer for a short period of time, and the amount of information stored at any one time is the latency of the loop. In some of the FIFO buffers the receiving frequency is greater than the transmission frequency such that these FIFO buffers operate at capacity and store a substantial amount of information. The accumulation of information in these FIFO buffers increases the latency of the loop which slows the transmission of information signals around the loop. There remains a need for elasticity FIFO buffers that reduce loop latency to support higher bandwidths across interfaces.

SUMMARY OF THE INVENTION

According to one embodiment of the present invention, a method of operating a loop having at least two nodes includes monitoring deletions in an adaptive elasticity first-in, first-out buffer in each node, identifying each adaptive elasticity first-in, first-out buffer that is a "deleter", and reducing a deletion threshold for each adaptive elasticity first-in, first-out buffer that is a deleter. A "deleter" is an adaptive elasticity first-in, first-out buffer for which information is deleted more often than information is inserted. According to another embodiment of the present invention a buffer includes an adaptive elasticity first-in, first-out buffer and a control circuit operatively configured to monitor deletions in the adaptive elasticity first-in, first-out buffer. The control circuit is operatively configured to determine if the adaptive elasticity first-in, first-out buffer is a deleter, and to reduce a deletion threshold for the adaptive elasticity first-in, first-out buffer if the adaptive elasticity first-in, first-out buffer is a deleter.

Advantageously, the method and the disc drive according to the embodiments of the present invention reduce loop latency by identifying adaptive elasticity first-in, first-out buffers that are deleters in a loop and then reducing the amount of information stored in the deleters by reducing the deletion threshold of the deleters. Advantageously, the reduction in loop latency speeds the transmission of information around the loop.

DESCRIPTION OF THE PREFERRED EMBODIMENT

In the following detailed description of exemplary embodiments of the present invention, reference is made to the accompanying drawings which form a part hereof, and in which are shown by way of illustration specific exemplary embodiments in which the present invention may be practiced. These embodiments are described in sufficient detail to enable those skilled in the art to practice the present invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the claims.

Figure 1:
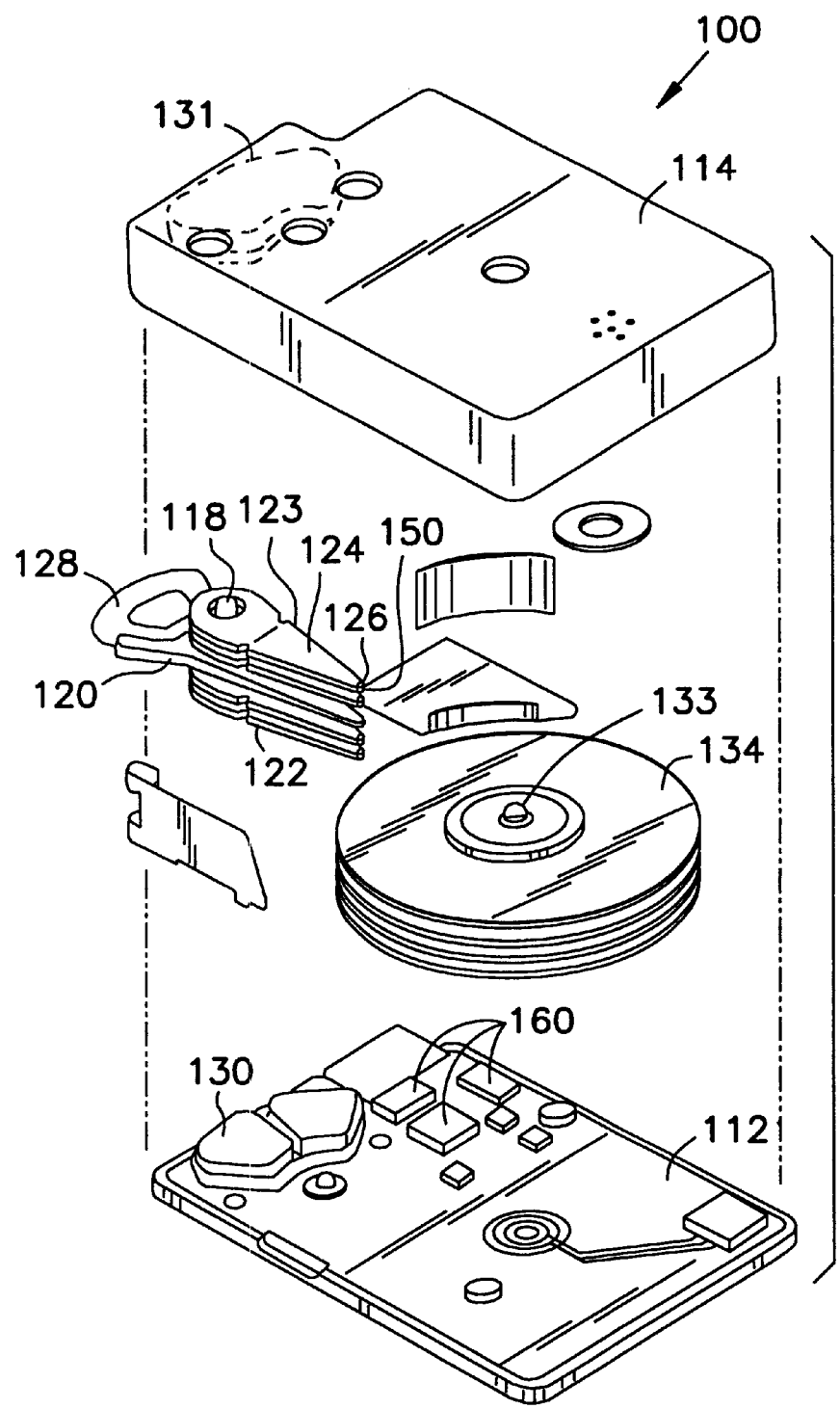
FIG. 1 is an exploded view of a disc drive according to an embodiment of the present invention.

The present invention described in this application is useful with all types of disc drives having either rotary or linear actuation, including hard disc drives, optical drives, zip drives, and floppy disc drives. An exploded view of a disc drive 100 having a rotary actuator according to an embodiment of the present invention is shown in FIG. 1. The disc drive 100 includes a housing or base 112 and a cover 114. The base 112 and cover 114 form a disc enclosure. Rotatably attached to the base 112 on an actuator shaft 118 is an actuator assembly 120. The actuator assembly 120 includes a comb-like structure 122 having a plurality of arms 123. Load beams or load springs 124 are attached to each arm 123 on the comb 122, and the load beams or load springs are also referred to as suspensions. Attached at the end of each load spring 124 is a slider 126 which carries a magnetic transducer 150. The slider 126 is a small ceramic block which is passed over one of several rotatable discs 134 as the disc 134 rotates so that the transducer 150 may read data from or write data to the disc 134. The transducer 150 is balanced over the disc 134 between a force from the load spring 124 and air pressure caused by the rotation of the disc 134. The slider 126 and the transducer 150 form what may be called a read/write head. It should also be noted that the embodiments of the present invention described herein are equally applicable to sliders 126 having more than one transducer 150, such as what is known as an MR or magneto resistive head in which one transducer 150 is generally used for reading and another is generally used for writing. On the end of the actuator assembly 120 opposite the load springs 124 and the sliders 126 is a voice coil 128.

Attached within the base 112 is a first magnet 130, and a second magnet 131 is attached to the cover 114. The first and second magnets 130, 131, and the voice coil 128 are components of a voice coil motor which applies a force to the actuator assembly 120 to rotate it about the actuator shaft 118. Also mounted to the base 112 is a spindle motor. The spindle motor includes a rotating portion called a spindle hub 133. In the disc drive 100, the spindle motor is within the spindle hub 133, and the discs 134 are attached to the spindle hub 133. The embodiments of the present invention described herein are equally applicable to disc drives which have a plurality of discs as,well as disc drives that have a single disc attached to a spindle hub. The embodiments of the present invention described herein are also equally applicable to disc drives with spindle motors which are under a spindle hub. Servo feedback information is used to accurately locate the transducer 150. The actuator assembly 120 is moved to and held at a precise position during a read or write operation using the servo information.

The disc drive 100 includes one or more integrated circuits 160 coupled to the transducer 150 in the slider 126 for providing a signal to the transducer 150 when data is being written to the discs 134 and for receiving and processing a signal from the transducer 150 when data is being read from the discs 134. One or more of the circuits 160 are coupled to a port (not shown) for exchanging signals with other devices through an interface such as a fibre channel arbitrated loop. Data to be written to the discs 134 is received through the port, and data read from the discs 134 is sent to other devices through the port. The circuits 160 may include a microprocessor or one or more state machines to control operations of the disc drive 100.

In this description information, including data or instructions, will be described as being transmitted in a digital signal comprising bits. The digital signal may be a voltage signal transmitted over an electrically conductive medium such as a copper wire, an acoustic signal, an optical signal transmitted through optics or over an optical medium such as an optical fibre, or another type of electromagnetic wave signal such as a radio signal. The embodiments of the present invention described herein may be implemented in conjunction with transmission mediums for any of the types of digital signals listed above. Also in this description a digital signal of "1" or one may also called a high signal and a digital signal of "0" or zero may also called a low signal.

Figure 2:
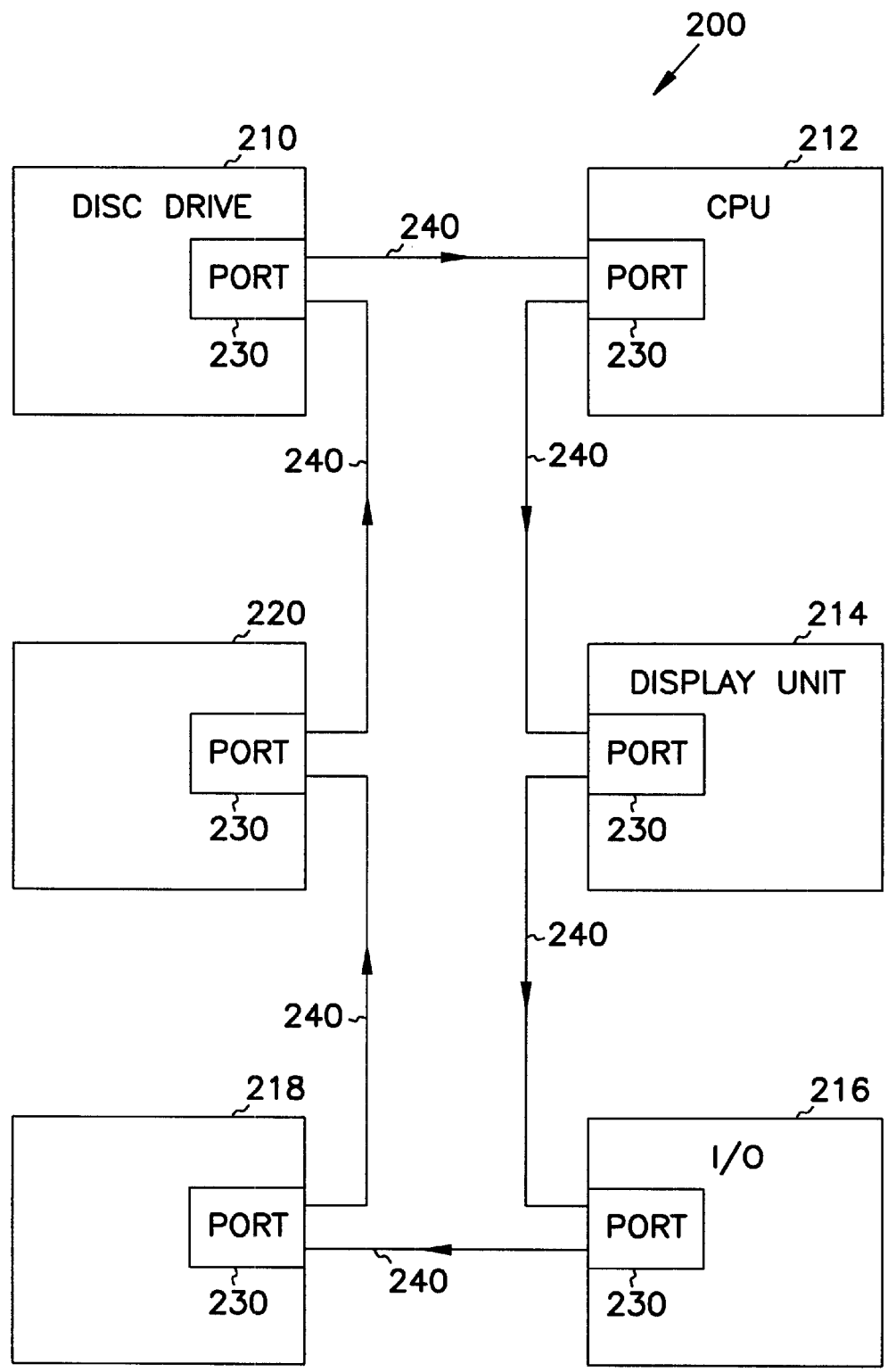
FIG. 2 is a block diagram of a fibre channel arbitrated loop according to an embodiment of the present invention.

A block diagram of a fibre channel arbitrated loop 200 linking devices in an information handling system according to an embodiment of the present invention is shown in FIG. 2. The loop 200 includes a disc drive 210, a central processing unit 212 (CPU), a display unit 214, and an input/output (I/O) subsystem 216. The CPU 212 may be, for example, a microprocessor. Two other devices 218, 220 are also linked to the loop 200. Each of the devices 210–220 is called a node in the loop 200, and is linked to the loop 200 by a node-loop port 230. Each port 230 includes a pair of fibres 240, an incoming fibre 240 to carry information signals into the port 230 from a preceding node and an outgoing fibre 240 to carry information signals out of the port 230 to a succeeding node. Each of the fibres 240 may be a coaxial wire such as a coaxial copper conductor, and may also comprise an optical fibre or other transmission medium for some or all of its length. Information signals including data or instructions are digital signals transmitted serially over the fibres 240. The pair of fibres 240 connected to each port is called a link and is part of the loop 200.

Each of the devices 218, 220 may be a data storage device such as a floppy disk drive, an optical disk drive, a CD ROM, or a tape drive. The display unit 214 in some embodiments is a monitor. The I/O device 216 in some embodiments is a modem. Each of the devices 218, 220 may also be a processor-based device such as a fabric controller, a network interface card, a camera, a video game, a handheld calculator, a television set-top box, a fixed-screen telephone, a smart mobile phone, a personal digital assistant (PDA), a network computer (NC), a hand-held computer, a personal computer, or a multiprocessor supercomputer; an information appliance such as, for example, a cellular telephone, a pager, or a daily planner or organizer; an information component such as, for example, a telecommunications modem; or an appliance such as, for example, a hearing aid, a washing machine, or a microwave oven having an electronic controller.

Information signals, including data or instructions, are generated and manipulated in the devices of the above-mentioned information handling system as digital signals. The digital signals are manipulated and transferred inside the devices in information bytes of 8 bits each. According to FC-PH, a byte may either be a valid data byte, hereinafter called a data byte, representing general data or instructions, or a special code that carries information to regulate communication over the fibre channel. The data bytes and special codes are encoded and expanded from 8 bits to 10 bits, and put in serial form before being transmitted over the fibre channel. In some embodiments the encoding is done according to an 8B/10B transmission code specified in FC-PH. 8-bit data bytes are encoded into 10-bit transmission characters, and the 8-bit special codes are encoded into 10-bit special characters. The transmission characters and special characters are deserialized and decoded into data bytes and special codes in a node receiving them from the fibre channel. Digital devices called 8B/10B encoders and decoders have been developed to carry out the encoding and decoding according to the 8B/10B transmission code.

Four contiguous transmission characters and special characters are treated as a unit called a transmission word. Likewise, four contiguous data bytes and special codes are treated as a unit called a word, both prior to transmission and after reception in a node. A word comprises 32 bits, and a transmission word comprises 40 bits. Selected words, also called ordered sets, are defined in FC-PH for particular purposes. Examples of ordered sets include frame delimiters, primitive signals, and primitive sequences. Frame decimeters are encoded into transmission words called start of frame (SOF) words and end of frame (EOF) words that indicate the beginning or the end of a frame. Transmission words are transmitted serially over the fibre channel in frames. A frame is comprised of a SOF Word, a 6-word header, a string of ordinary transmission words containing data or instructions, a CRC word for error correction, and an EOF word. An example of a primitive signal is an idle word, also called a fill word, which is transmitted on the fibre channel when no frames are being transmitted. There is a constant stream of words transmitted over the fibre channel, and when no information is being communicated between devices the empty space is filled by fill words. The 40 bit fill words on the fibre channel correspond to decoded 32 bit fill words in a node. Each fill word comprises four 8-bit fill bytes.

Figure 3:
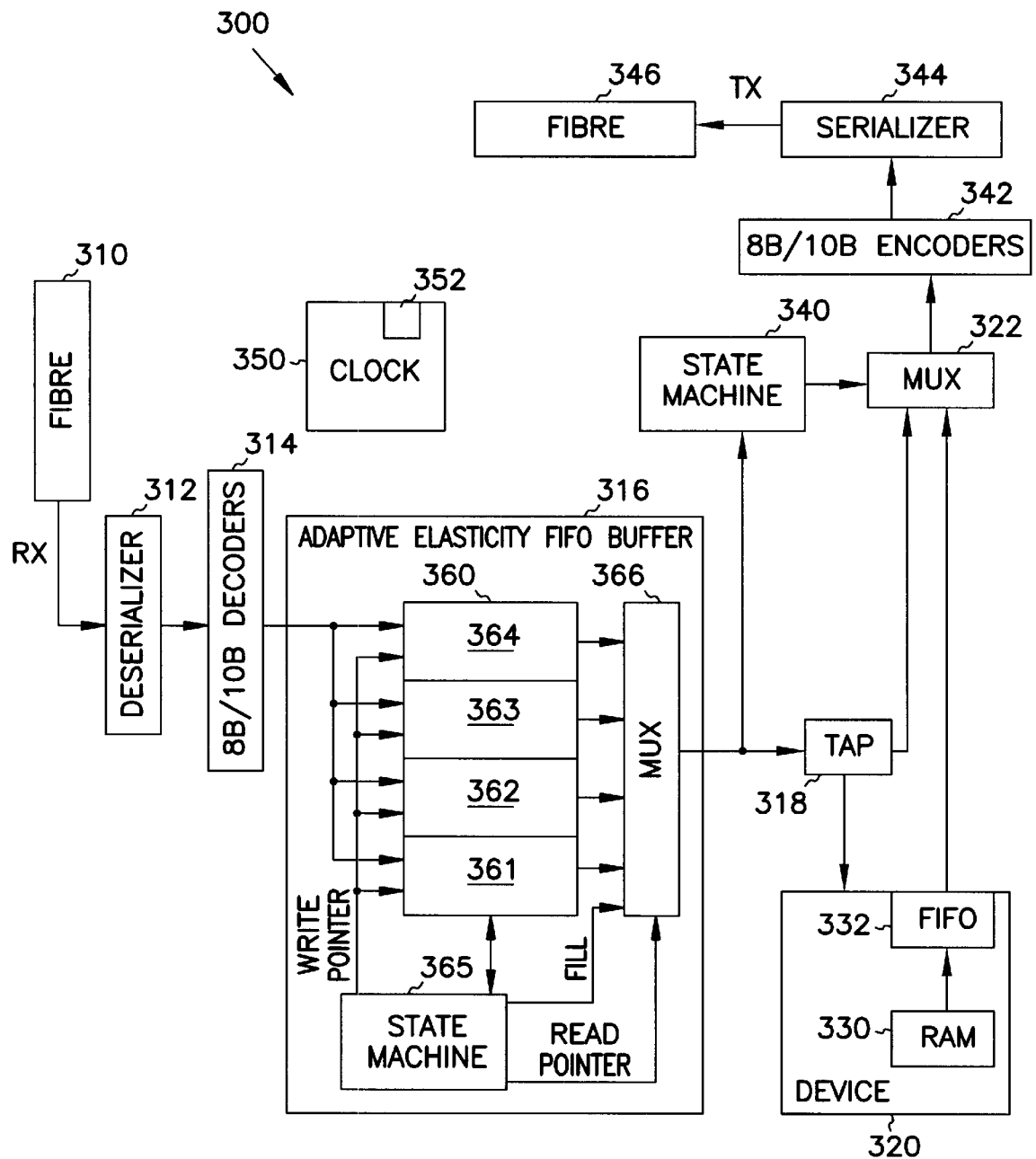
FIG. 3 is a block diagram of a node-loop port including an adaptive elasticity first-in, first-out buffer according to an embodiment of the present invention.

A block diagram of a node-loop port 300 in a node coupled to a loop according to an embodiment of the present invention is shown in FIG. 3. The port 300 is coupled to receive a serial information signal from a preceding node through an incoming fibre 310. The serial information signal is received at a frequency RX determined by the preceding node. The information signal is deserialized into a parallel signal in a deserializer 312, and the parallel signal is decoded by 8B/10B decoders 314. The port 300 may be implemented in either bit-, byte-, half-word-(two bytes) or word-wide units. In this description the parallel signal generated by the deserializer 312 will be described as a word for purposes of brevity. An adaptive elasticity FIFO buffer 316 receives and temporarily stores the word and then provides the word to a tap 318 which directs the word to a device 320 or to a multiplexer 322. The action of the tap 318 is indicated by whether the device 320 is to receive the word from the incoming fibre 310, or the word is to be passed on through to the next node. The device 320 includes a random access memory (RAM) 330 and a FIFO buffer 332 for transmitting information to the loop. The FIFO buffer 332 is coupled to provide the information to the multiplexer 322 which is controlled by a state machine 340. The state machine 340 also receives the word from the adaptive elasticity FIFO buffer 316 and directs the multiplexer 322 to pass either the word or the information to 8B/10B encoders 342 and a serializer 344 to be transmitted through an outgoing fibre 346 to a succeeding node at a transmission frequency TX. All of the elements in the node 300 operate according to a clock signal generated by a clock 350 fed by a crystal 352 which determines the transmission frequency TX.

The adaptive elasticity FIFO buffer 316 includes a bank of FIFO registers 360 coupled to receive and store the word from the 8B/10B decoders 314. The registers 360 are divided into four levels: level one 361, level two 362, level three 363, and level four 364. Level one 361 is the lowest level in the registers 360, and if level one 361 is empty the registers 360 are empty. Level four 364 is the highest level of the registers 360, and if level four 364 is full of stored words then the registers 360 are full. The adaptive elasticity FIFO buffer 316 may also be implemented in either bit-, byte-, half-word-(two bytes) or word-wide units. The adaptive elasticity FIFO buffer 316 is controlled by a state machine 365 that is coupled to provide a write pointer to the registers 360 to indicate which registers 360 are to receive the next word. Each of the registers 360 are coupled to be read by a multiplexer 366 which transfers words from the registers 360 to the device 320 or directly to the multiplexer 322 through the tap 318. The state machine 365 receives each of the words stored in the registers 360, and is coupled to provide a read pointer to the multiplexer 366 to indicate the registers 360 to be read. The state machine 365 manages the write pointer and the read pointer to maintain the first-in, first-out logic of the adaptive elasticity FIFO buffer 316. The registers 360 that have stored a word for the longest period of time are the next registers 360 to be read. The state machine 365 is also coupled to provide fill words to the multiplexer 366.

The adaptive elasticity FIFO buffer 316 has a finite capacity to store words. It receives and stores words at the frequency RX and words are read from it at the transmission frequency TX. As described above, often the frequencies RX and TX are different which results in either a build-up of words, called buffer over-run, if RX is greater than TX, or an unwanted absence of words, called buffer under-run, if TX is greater than RX. One out of every thousand words may be affected by this situation. The adaptive elasticity FIFO buffer 316 is managed to avoid over-run by periodically deleting a fill word from the registers 360. The adaptive elasticity FIFO buffer 316 is managed to avoid under-run by periodically inserting a fill word into the multiplexer 366 to be transmitted over the outgoing fibre 346 and allowing the registers 360 to accumulate another word received from the incoming fibre 310. As described above, fill words may be transmitted on the fibre channel to fill up space between frames containing information being communicated between nodes. The insertion or deletion of a fill word does not disrupt the communication.

Figure 4:
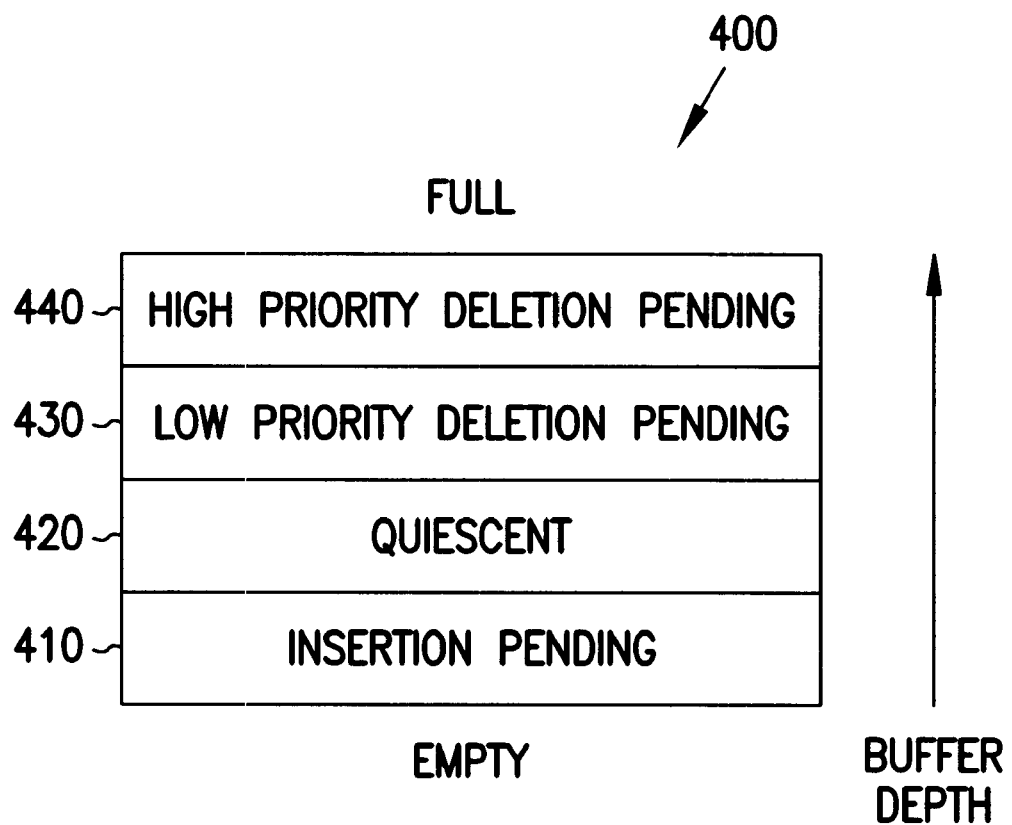
FIG. 4 is a clock-skew-management diagram for the adaptive elasticity first-in, first-out buffer shown in FIG. 3.

The adaptive elasticity FIFO buffer 316 is managed according to a clock-skew management diagram 400 shown in FIG. 4. A difference between the write pointer and the read pointer, called the buffer depth, indicates the number of words currently stored in the registers 360. If the write pointer equals the read pointer, the buffer depth is zero and the registers 360 are empty. In this situation, the multiplexer 366 transfers a fill word received directly from the state machine 365 and does not read any of the registers 360. A sum of the buffer depths of the nodes of the loop is the latency of the loop. The management diagram illustrates four states for the adaptive elasticity FIFO buffer 316 based on the buffer depth. An insertion pending state 410 occurs when the number of words stored in the registers 360 falls below an insertion threshold. The insertion threshold is low, but is substantial enough to prevent under-run when a frame is being received. In the insertion pending state 410 the state machine 365 will insert a fill word into the multiplexer 366 immediately after a fill word is read from the registers 360. The registers 360 are allowed to accumulate another word while the fill word is being inserted. The state machine 365 will not insert a fill word if a frame is being read from the registers 360 so the frame is not interrupted.

A quiescent state 420 occurs when the number of words stored by the registers 360 is greater than the insertion threshold, but less than a deletion threshold that would require a deletion of a fill word from the registers 360. No insertions or deletions take place in the quiescent state 420.

A deletion pending state 430, 440 occurs when the words stored in the registers 360 exceed the deletion threshold. The deletion pending state 430, 440 comprises a low-priority portion 430 and a high-priority portion 440, as will be described below. The deletion threshold is high and is selected to allow a minimum of space in the registers 360 to prevent over-run when a frame is being received and none of the words in the frame may be deleted. In the deletion pending state 430, 440 a deletion of a fill word in the registers 360 is made in consideration of a requirement that a minimum of six primitive signals, such as fill words, be present between each frame. The six primitive signals comprise an inter-frame gap specified in FC-PH. In the low priority deletion pending state 430 a fill word is deleted only after four fill words have been received without an intervening transmission character or special character, such as those transmitted in a frame. If the words stored in the registers 360 rise above a super threshold, and there is a real threat of over-run, then a high priority deletion pending state 440 is reached in which a fill word is deleted after two fill words have been received without an intervening transmission character or special character. The insertion, deletion, and super thresholds may be selected according to the capacity of the adaptive elasticity FIFO buffer 316.

In a given loop, some of the adaptive elasticity FIFO buffers 316 will undergo deletions much more often than insertions, even to the exclusion of insertions. These adaptive elasticity FIFO buffers 316 are called deleters. Some of the adaptive elasticity FIFO buffers 316, called inserters, will undergo insertions much more often than deletions, and some will toggle between insertions and deletions if the frequency RX is substantially equal to the frequency TX. Inserters store words near the insertion threshold, and thus do not contribute substantially to loop latency. The adaptive elasticity FIFO buffers 316 that toggle contribute slightly more to loop latency. Deleters are the biggest contributors to Loop latency because they store words so as to be perpetually near the deletion threshold, and therefore deleters are a substantial impediment to increased speed of communication around a loop.

Figure 5:
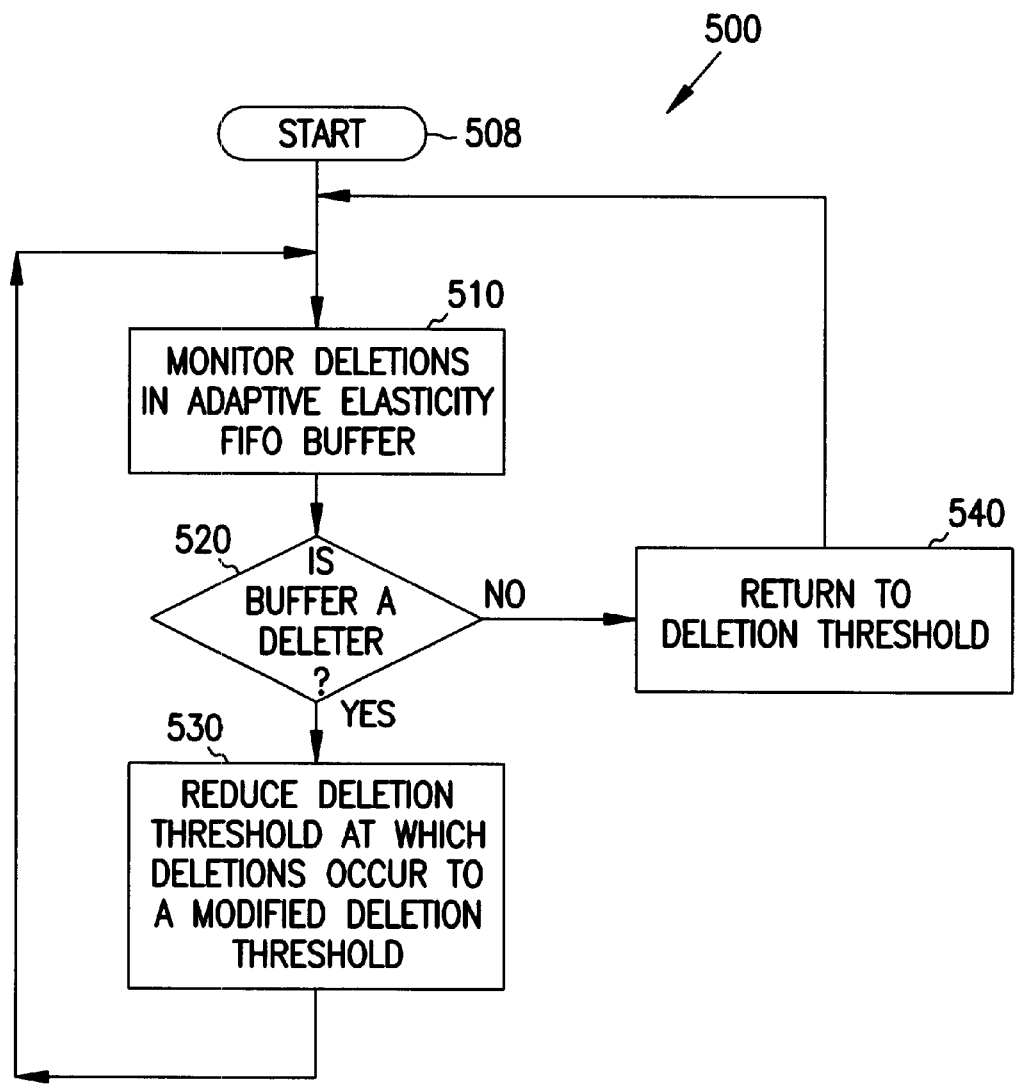
FIG. 5 is a flowchart of a method for managing an adaptive elasticity first-in, first-out buffer according to an embodiment of the present invention.

A method 500 for managing an adaptive elasticity FIFO buffer according to an embodiment of the present invention is shown in FIG. 5. The method 500 starts in 508, monitors deletions in the buffer in 510, determines if the buffer is a deleter in 520, and reduces the deletion threshold at which deletions occur to a modified deletion threshold in 530 if the buffer is a deleter. The method 500 then continues to monitor deletions in 510. If the buffer is not a deleter then the method returns to the deletion threshold in 540 and continues to monitor the deletions in 510. The method 500 reduces loop latency by firs identifying the deleters in the loop and then reducing the number of words stored in each deleter. If conditions in the loop change, such as the temperature in one or more of the nodes, or if the loop is modified by the addition or removal of a device, then the method may return to the deletion threshold if the status of the buffer changes. The buffer depth is adapted to minimize loop latency in changing conditions. The state machine 365 is a sequential logic circuit including both logic gates and storage elements designed to implement algorithms directly in hardware. The state machine 365 may include logic gates and storage elements to carry out each act of the method 500.

Figure 6:
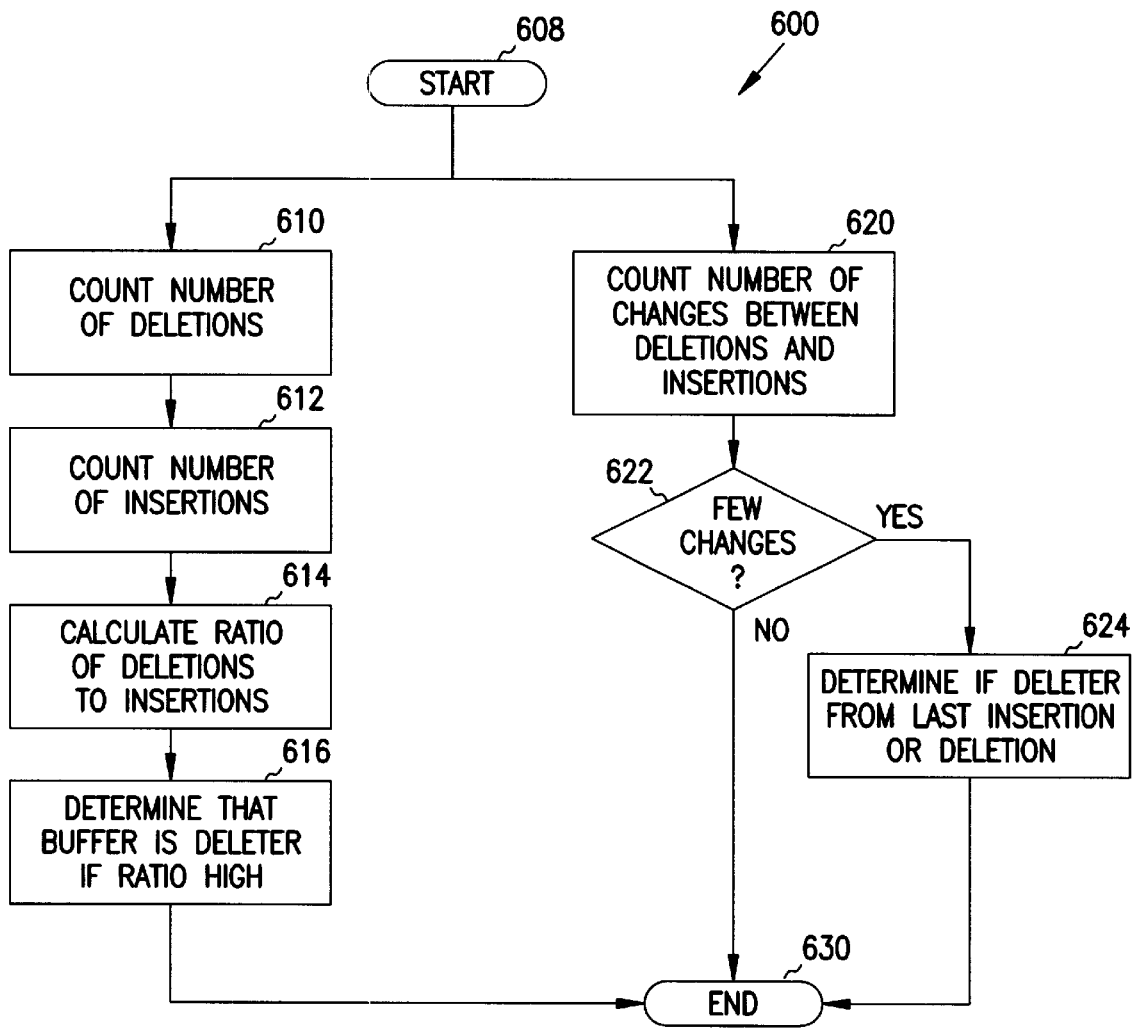
FIG. 6 is a flowchart of a method for monitoring deletions in an adaptive elasticity first-in, first-out buffer and for determining whether the adaptive elasticity first-in, first-out buffer is a deleter.

A method 600 for monitoring deletions in 510 and for determining whether an adaptive elasticity FIFO buffer is a deleter is shown in FIG. 6. The method 600 starts in 608 and includes two portions. In the first portion, a number of deletions in the buffer is counted in 610, and a number of insertions in the buffer is counted in 612. A ratio of deletions to insertions is calculated in 614, and the buffer is identified as a deleter if the ratio is high in 616. In the second portion, a number of changes between deletions and insertions in the buffer is counted in 620. If there are few changes as determined in 622, the method 600 determines if the buffer is a deleter from the last deletion or insertion in 624. If the last act is a deletion then the buffer is identified as a deleter, and if the last act is an insertion the buffer is identified as an inserter. If there are a substantial number of changes, then the buffer is toggling. In an alternative embodiment of the present invention, the time period between deletions may be counted, and the shorter the time period is the more likely the buffer is a deleter. In another alternative embodiment of the invention, any two or all three of the above-mentioned techniques for determining whether an adaptive elasticity FIFO buffer is a deleter may be implemented in parallel for added robustness. The two portions of the method 600 are implemented in parallel, and end in 630. The state machine 365 may include logic gates and storage elements to carry out each act of the method 600.

Figure 7:
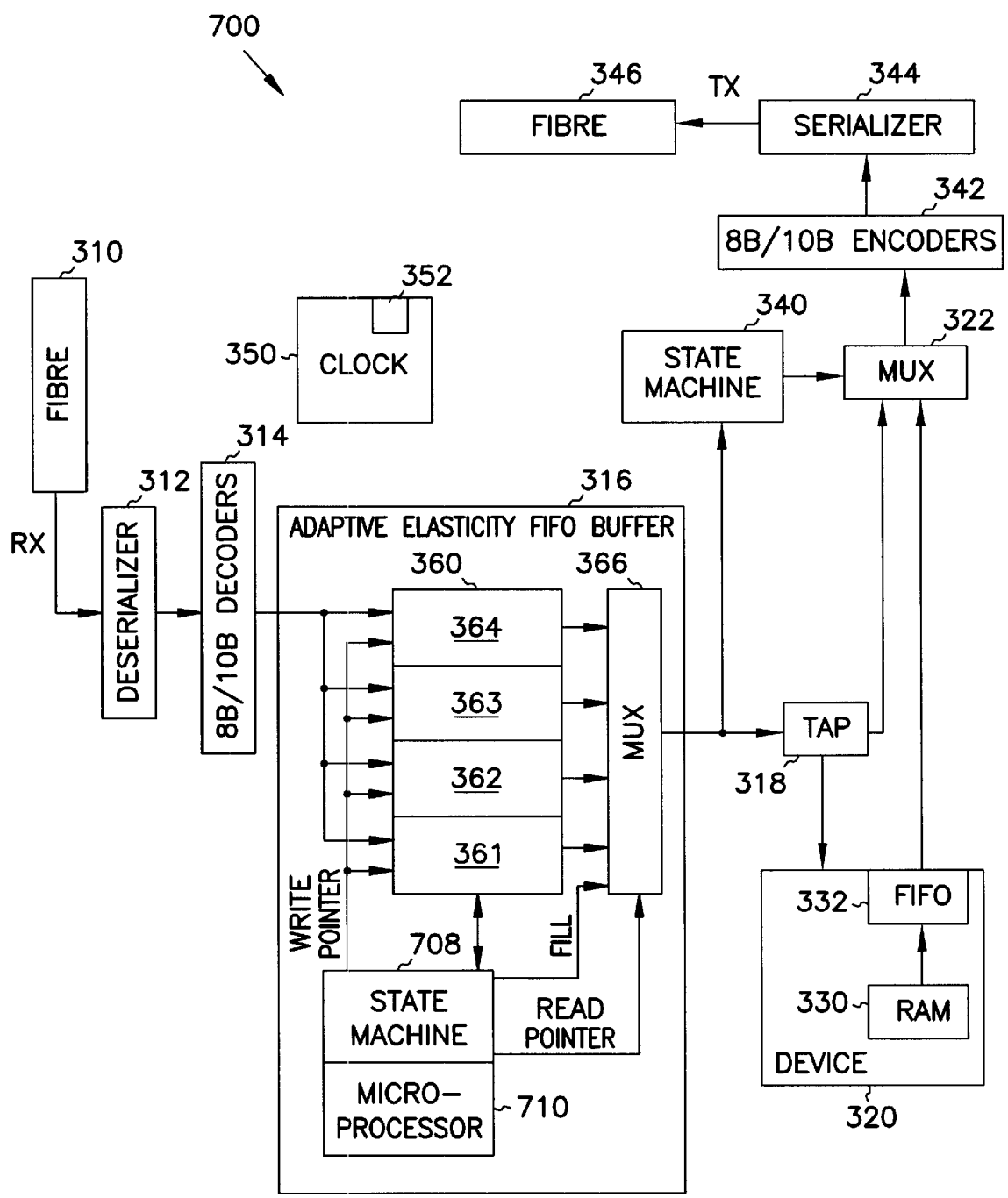
FIG. 7 is a block diagram of a node-loop port including an adaptive elasticity first-in, first-out buffer according to an embodiment of the present invention.

A block diagram of a node-loop port 700 in a node coupled to a loop according to an embodiment of the present invention is shown in FIG. 7. The port 700 is similar to the port 300 shown in FIG. 3, and similar elements have retained the same reference numerals for purposes of clarity. The adaptive elasticity FIFO buffer 316 is controlled by a combination of a state machine 708 and a microprocessor 710 instead of the state machine 365 shown in FIG. 3, and the microprocessor 710 contains a series of programmable instructions stored and implemented to carry out the techniques and methods for determining whether the adaptive elasticity FIFO buffer 316 is a deleter as described above. In an alternative embodiment of the present invention interrupts may be used to monitor deletions in the adaptive elasticity FIFO buffer 316. Specifically, the microprocessor 710 may be subject to an interrupt each time a deletion or an insertion occurs, and separate programmed counters may monitor the insertions and deletions. In addition, the microprocessor 710 may be subject to an interrupt each time there is a change between a deletion and an insertion in the buffer.

Figure 8:
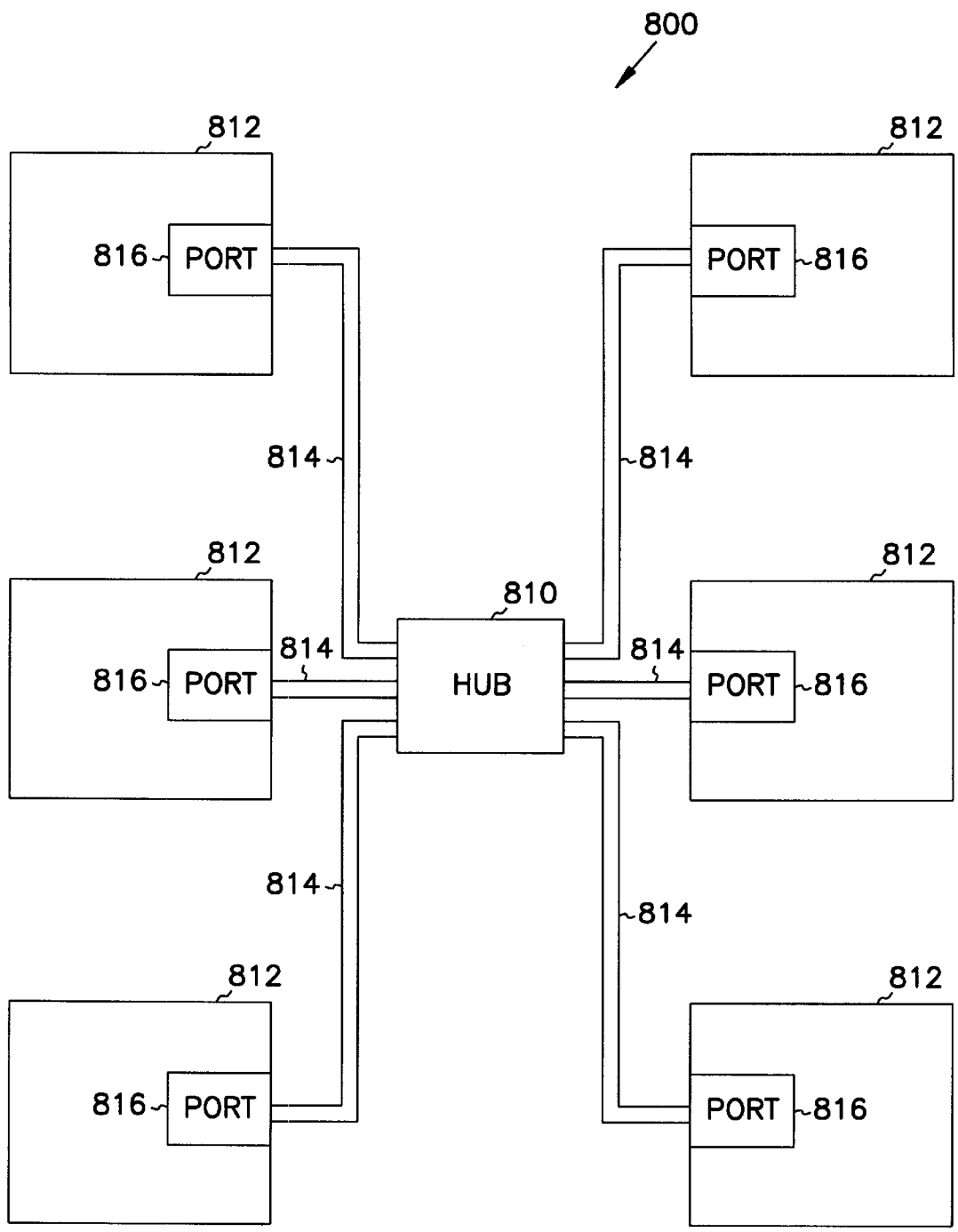
FIG. 8 is a block diagram of an information handling system according to an embodiment of the present invention.

A block diagram of an information handling system 800 according to an embodiment of the present invention is shown in FIG. 8. The system 800 is structured in a star configuration around a hub 810 which includes a CPU. The hub 810 is coupled to each of several devices 812 through a point-to-point fibre channel interface 814. Each fibre channel interface 814 comprises two fibres coupled in parallel between a port (not shown) in the hub 810 and a port 816 in a respective device 812. The ports in the hub 810 and the ports 816 are similar to the port 300 shown in FIG. 3, or the port 700 shown in FIG. 7. Each of the ports in the hub 810 and the ports 816 includes an adaptive elasticity FIFO buffer according to the embodiments of the present invention described above. The devices 812 may include a disc drive, a display unit, an I/O subsystem, and any of the devices listed above in conjunction with the information handling system shown in FIG. 2.

Advantageously, the methods, the information handling systems, and the disc drive described according to the embodiments of the present invention reduce loop latency by identifying adaptive elasticity FIFO buffers that are deleters in a loop and then reducing the amount of information stored in the deleters by reducing the deletion threshold of the deleters.

Conclusion

In conclusion, a method of operating a data network loop 200 having at least two nodes 210–220 is disclosed. Deletions are monitored in an adaptive elasticity first-in, first-out buffer 316 in each node 210–220. Each adaptive elasticity first-in, first-out buffer 316 that is a deleter is identified, the deleter being defined as an adaptive elasticity first-in, first-out buffer for which information is deleted more often than information is inserted, and a deletion threshold is reduced for each adaptive elasticity first-in, first-out buffer 316 that is a deleter. The deletion threshold is reduced by reducing the deletion threshold to a modified deletion threshold for each adaptive elasticity first-in, first-out buffer 316 that is a deleter, and deleting information from an adaptive elasticity first-in, first-out buffer 316 that is a deleter when information stored in the adaptive elasticity first-in, first-out buffer 316 rises above the modified deletion threshold. More specifically, a fill word is deleted from an adaptive elasticity first-in, first-out buffer 316 when information stored in the adaptive elasticity first-in, first-out buffer 316 rises above the modified deletion threshold. Deletions are monitored and deleters are identified by counting a number of deletions in an adaptive elasticity first-in, first-out buffer 316 in each node 210–220, counting a number of insertions in each adaptive elasticity first-in, first-out buffer 316, calculating a ratio of deletions to insertions for each adaptive elasticity first-in, first-out buffer 316, and determining that an adaptive elasticity first-in, first-out buffer 316 that is a deleter if the ratio is higher than a predetermined ratio. Alternatively, a number of changes between deletions and insertions in an adaptive elasticity first-in, first-out buffer in each node is counted, and an adaptive elasticity first-in, first-out buffer 316 is determined to be a deleter if the number of changes between deletions and insertions in the adaptive elasticity first-in, first-out buffer 316 is less than a predetermined threshold and the adaptive elasticity first-in, first-out buffer 316 last underwent a deletion. In another alternative embodiment of the present invention, a time period between deletions in an adaptive elasticity first-in, first-out buffer 316 in each node is counted, and an adaptive elasticity first-in, first-out buffer 316 is determined to be a deleter if the time period for the adaptive elasticity first-in, first-out buffer 316 is shorter than a predetermined time period. Alternatively, each adaptive elasticity first-in, first-out buffer 316 may be identified as a deleter by implementing two or three methods selected from a group consisting of the three methods mentioned above.

Also disclosed is a buffer 316 that includes an adaptive elasticity first-in, first-out buffer 316, and a control circuit 365 operatively configured to monitor deletions in the adaptive elasticity first-in, first-out buffer 316, determine if the adaptive elasticity first-in, first-out buffer 316 is a deleter, the deleter being defined as an adaptive elasticity first-in, first-out buffer for which information is deleted more often than information is inserted, and reduce a deletion threshold for the adaptive elasticity first-in, first-out buffer 316 if the adaptive elasticity first-in, first-out buffer 316 is a deleter. The control circuit 365 may be a state machine 365 or a combination of a state machine 708 and a microprocessor 710. The control circuit 365 may be operatively configured to reduce the deletion threshold to a modified deletion threshold if the adaptive elasticity first-in, first-out buffer 316 is a deleter, and delete information from the adaptive elasticity first-in, first-out buffer 316 when information stored in the adaptive elasticity first-in, first-out buffer 316 rises above the modified deletion threshold. The control circuit 365 may also be operatively configured to delete a fill word from the adaptive elasticity first-in, first-out buffer 316 if the adaptive elasticity first-in, first-out buffer 316 is a deleter when information stored in the adaptive elasticity first-in, first-out buffer 316 rises above the modified deletion threshold. The control circuit 365 may be operatively configured to count a number of deletions in the adaptive elasticity first-in, first-out buffer 316, count a number of insertions in the adaptive elasticity first-in, first-out buffer 316, calculate a ratio of deletions to insertions for the adaptive elasticity first-in, first-out buffer 316, and determine that the adaptive elasticity first-in, first-out buffer 316 is a deleter if the ratio is higher than a predetermined ratio. The control circuit 365 may also be operatively configured to count a number of changes between deletions and insertions in the adaptive elasticity first-in, first-out buffer 316, and determine that the adaptive elasticity first-in, first-out buffer 316 is a deleter if there are fewer changes between deletions and insertions than a predetermined threshold and the adaptive elasticity first-in, first-out buffer 316 last underwent a deletion. The control circuit 365 may also be operatively configured to count a time period between deletions in the adaptive elasticity first-in, first-out buffer 316, and determine that the adaptive elasticity first-in, first-out buffer 316 is a deleter if the time period is shorter than a predetermined time period. Also disclosed is a port 300 that includes a deserializer 312 coupled to receive signals from an interface 240, a decoder 314 coupled to receive signals from the deserializer 312, an encoder 342 coupled to receive signals from the adaptive elasticity first-in, first-out buffer 316, and a serializer 344 coupled to receive signals from the encoder 342. Also disclosed is a disc drive 100 that includes a base 112, a disc 134 rotatably attached to the base 112, a spindle motor 133 attached to the base 112 to rotate the disc 134, and an actuator 120 attached to the base 112. One end of the actuator 120 has a transducer 150 and the other end of the actuator 120 has a voice coil 128 which forms a portion of a voice coil motor 128, 130. In addition the disc drive 100 includes a circuit 160 coupled to the transducer to exchange signals with the transducer 150 to read data from and write data to the disc 134. The circuit 160 includes a port 300 coupled to an interface 240. Also disclosed is an information handling system 200 including the disc drive 100, a central processing unit operatively coupled to the disc drive, a memory device operatively coupled to the central processing unit, and an input/output subsystem operatively coupled to the central processing unit.

Also disclosed is an information handling system 200 including a central processing unit 212 operatively coupled to an interface, a memory device 218 operatively coupled to the interface, and an input/output subsystem 220 operatively coupled to the interface. The information handling system 200 also includes a disc drive 100 operatively coupled to the interface through a port 300, the port 300 including an adaptive elasticity first-in, first-out buffer 316 and a control circuit 365. The control circuit 365 is operatively configured to monitor deletions in the adaptive elasticity first-in, first-out buffer 316, determine if the adaptive elasticity first-in, first-out buffer 316 is a deleter, the deleter being defined as being an adaptive elasticity first-in, first-out buffer 316 for which information is deleted more often than information is inserted, and reduce a deletion threshold for the adaptive elasticity first-in, first-out buffer 316 if the adaptive elasticity first-in, first-out buffer 316 is a deleter.

Also disclosed is an information handling system 200 including a plurality of devices 212–220 coupled to each other through an interface 240, a disc drive 210 coupled to the interface and having an adaptive elasticity first-in, first-out buffer 316, and a circuit 160 for managing the adaptive elasticity first-in, first-out buffer 316.

It is to be understood that the above description is intended to be illustrative, and not restrictive. Many other embodiments will be apparent to those of skill in the art upon reviewing the above description. The scope of the invention should, therefore, be determined with reference to the claims, along with the full scope of equivalents to which such claims are entitled.

What is claimed is:

1. A method of operating a data network loop having at least two nodes, the method comprising steps of:
   (a) monitoring deletions in each adaptive elasticity first-in, first-out buffer in each node;
   (b) identifying each adaptive elasticity first-in, first-out buffer that is a deleter, wherein a deleter is defined as being an adaptive elasticity first-in, first-out buffer for which information is deleted more often than information is inserted;
   (c) reducing a variable deletion threshold while in the process of deleting or inserting information for each adaptive elasticity first-in, first-out buffer that is a deleter; and
   (d) repeating steps (a) through (c) until each adaptive elasticity first-in, first-out buffer is not identified as a deleter.

2. The method of claim 1 wherein reducing step (c) comprises steps of:
   (c)(i) reducing the deletion threshold to a modified deletion threshold for each adaptive elasticity first-in, first-out buffer that is a deleter; and
   (c)(ii) deleting information from an adaptive elasticity first-in, first-out buffer that is a deleter when information stored in the adaptive elasticity first-in, first-out buffer rises above the modified deletion threshold.

3. The method of claim 2 wherein deleting step (c)(ii) comprises deleting a fill word from an adaptive elasticity first-in, first-out buffer when information stored in the adaptive elasticity first-in, first-out buffer rises above the modified deletion threshold.

4. The method of claim 1 wherein identifying step (b) comprises steps of:
   (b)(i) counting a number of deletions in an adaptive elasticity first-in, first-out buffer in each node;
   (b)(ii) counting a number of insertions in each adaptive elasticity first-in, first-out buffer;
   (b)(iii) calculating a ratio of deletions to insertions for each adaptive elasticity first-in, first-out buffer; and
   (b)(iv) determining that an adaptive elasticity first-in, first-out buffer that is a deleter if the ratio is higher than a predetermined ratio.

5. The method of claim 1 wherein identifying step (b) comprises steps of:
   (b)(i) counting a number of changes between deletions and insertions in an adaptive elasticity first-in, first-out buffer in each node; and
   (b)(ii) determining that an adaptive elasticity first-in, first-out buffer is a deleter if the number of changes between deletions and insertions in the adaptive elasticity first-in, first-out buffer is less than a predetermined threshold and the adaptive elasticity first-in, first-out buffer last underwent a deletion.

6. The method of claim 1 wherein identifying step (b) comprises steps of:
   (b)(i) counting a time period between deletions in an adaptive elasticity first-in, first-out buffer in each node; and
   (b)(ii) determining that an adaptive elasticity first-in, first-out buffer is a deleter if the time period for the adaptive elasticity first-in, first-out buffer is shorter than a predetermined time period.

7. The method of claim 1 wherein identifying step (b) comprises two or three steps selected from the group consisting of:
   (b)(i) counting a number of deletions in an adaptive elasticity first-in, first-out buffer in each node, counting a number of insertions in each adaptive elasticity first-in, first-out buffer, calculating a ratio of deletions to insertions for each adaptive elasticity first-in, first-out buffer, and determining that an adaptive elasticity first-in, first-out buffer that is a deleter if the ratio is higher than a predetermined ratio;
   (b)(ii) counting a number of changes between deletions and insertions in an adaptive elasticity first-in, first-out buffer in each node, and determining that an adaptive elasticity first-in, first-out buffer is a deleter if the number of changes between deletions and insertions in the adaptive elasticity first-in, first-out buffer is less than a predetermined threshold and the adaptive elasticity first-in, first-out buffer last underwent a deletion; and
   (b)(iii) counting a time period between deletions in an adaptive elasticity first-in, first-out buffer in each node, and determining that an adaptive elasticity first-in, first-out buffer is a deleter if the time period for the adaptive elasticity first-in, first-out buffer is shorter than a predetermined time period.

8. A buffer comprising:
   at least one adaptive elasticity first-in, first-out buffer; and
   a control circuit operatively configured to:
      (a) monitor deletions in each adaptive elasticity first-in, first-out buffer;

(b) determine if each adaptive elasticity first-in, first-out buffer is a deleter, wherein a deleter is defined as being an adaptive elasticity first-in, first-out buffer for which information is deleted more often than information is inserted; and (c) reduce a variable deletion threshold while in the process of deleting or inserting information for each adaptive elasticity first-in, first-out buffer if the adaptive elasticity first-in, first-out buffer is a deleter; and (d) repeat steps (a) through (c) until each adaptive elasticity first-in, first-out buffer is not identified as a deleter.

9. The buffer of claim 8 wherein the control circuit comprises a state machine.

10. The buffer of claim 8 wherein the control circuit comprises a state machine and a microprocessor.

11. The buffer of claim 8 wherein the control circuit is further operatively configured to:

(a) reduce the deletion threshold to a modified deletion threshold if the adaptive elasticity first-in, first-out buffer is a deleter; and (b) delete information from the adaptive elasticity first-in, first-out buffer when information stored in the adaptive elasticity first-in, first-out buffer rises above the modified deletion threshold.

12. The buffer of claim 11 wherein the control circuit is further operatively configured to delete a fill word from the adaptive elasticity first-in, first-out buffer if the adaptive elasticity first-in, first-out buffer is a deleter when information stored in the adaptive elasticity first-in, first-out buffer rises above the modified deletion threshold.

13. The buffer of claim 8 wherein the control circuit is further operatively configured to:

(a) count a number of deletions in the adaptive elasticity first-in, first-out buffer;

(b) count a number of insertions in the adaptive elasticity first-in, first-out buffer;

(c) calculate a ratio of deletions to insertions for the adaptive elasticity first-in, first-out buffer; and (d) determine that the adaptive elasticity first-in, first-out buffer is a deleter if the ratio is higher than a predetermined ratio.

14. The buffer of claim 8 wherein the control circuit is further operatively configured to:

(a) count a number of changes between deletions and insertions in the adaptive elasticity first-in, first-out buffer; and (b) determine that the adaptive elasticity first-in, first-out buffer is a deleter if there are few changes between deletions and insertions than a predetermined threshold and the adaptive elasticity first-in, first-out buffer last underwent a deletion.

15. The buffer of claim 8 wherein the control circuit is further operatively configured to:

(a) count a time period between deletions in the adaptive elasticity first-in, first-out buffer; and (b) determine that the adaptive elasticity first-in, first-out buffer is a deleter if the time period is shorter than a predetermined time period.

16. A port of the type including the buffer of claim 8 and further comprising:

a deserializer coupled to receive signals from an interface;

a decoder coupled to receive signals from the deserializer;

an encoder coupled to receive signals from the adaptive elasticity first-in, first-out buffer; and a serializer coupled to receive signals from the encoder.

17. A disc drive of the type including the port of claim 16 and further comprising:

a base;

a disc rotatably attached to the base;

a spindle motor attached to the base and coupled to rotate the disc;

an actuator attached to the base, one end of the actuator having a transducer and the other end of the actuator having a voice coil which forms a portion of a voice coil motor; and a circuit coupled to the transducer to exchange signals with the transducer to read data from and write data to the disc, the circuit including the port coupled to an interface.

18. An information handling system of the type including the disc drive of claim 17 and further comprising:

a central processing unit operatively coupled to the disc drive;

a data storage device operatively coupled to the central processing unit; and an input/output subsystem operatively coupled to the central processing unit.

19. An information handling system comprising:

a central processing unit operatively coupled to an interface;

a data storage device operatively coupled to the interface;

an input/output subsystem operatively coupled to the interface; and a disc drive operatively coupled to the interface through a port, the port comprising:

at least one adaptive elasticity first-in, first-out buffer; and a control circuit operatively configured to:

(a) monitor deletions in each adaptive elasticity first-in, first-out buffer;

(b) determine if each adaptive elasticity first-in, first-out buffer is a deleter, wherein a deleter is defined as being an adaptive elasticity first-in, first-out buffer for which information is deleted more often than information is inserted; and (c) reduce a variable deletion threshold while in the process of deleting or inserting information for each adaptive elasticity first-in, first-out buffer if the adaptive elasticity first-in, first-out buffer is a deleter; and (d) repeat steps (a) through (c) until each adaptive elasticity first-in, first-out buffer is not identified as a deleter.

* * * * *